Patented Jan. 7, 1941

2,228,039

UNITED STATES PATENT OFFICE 2,228,039

PROCESS AND PRODUCTS RELATING TO AMINO METHYLENE ALDEHYDES

Adrianus Johannes van Peski, Nicolaas Max, and Johannes Andreas van Melsen, Amsterdam, Netherlands, assignors to Shell Development Company, San Francisco, Calif., a corporation of Delaware No Drawing. Application February 11, 1939, Serial No. 255,874. In the Netherlands February 22, 1938

14 Claims. (Cl. 260—577)

The present invention relates to amino methylene aldehydes of the general formula

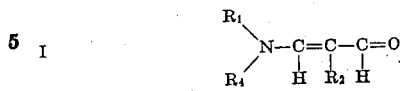

wherein $R_1$, $R_2$ and $R_4$ each represent a hydrogen atom or an organic radical.

An object of the invention is to provide new and useful amino methylene aldehydes of the above general formula. A further object of the invention is to provide new and useful metal derivatives of the amino methylene aldehydes. Still a further object is to provide a process for the preparation of the above class of amino methylene aldehydes and the metal derivatives thereof.

Amino methylene aldehydes of the above general formula, we have found, may be prepared, in general, by reacting ammonia or an amine containing at least one replaceable nitrogen-bond hydrogen atom with a dialdehyde of the general formula

The reaction, although it proceeds at quite different rates depending on the type and character of the amino-compound employed and upon the character of the substituent designated by $R_2$, takes place, in general, readily with good yields and is, we have found, quite characteristic of dialdehydes of the general structure II. Dialdehydes having carbonyl groups separated by more than one carbon atom, for example, do not undergo the reaction. In order for the reaction to take place it is furthermore necessary that the carbon atom connecting the two carbonyl groups have at least one hydrogen atom attached thereto. The reaction apparently proceeds according to the following mechanism:

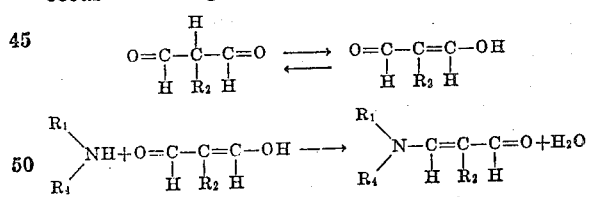

The character of the product and to some extent the rate of reaction depends upon the character of the amino-compound employed and the substituent designated in the general formula by $R_2$. $R_2$ may, in general, be a hydrogen atom or any organic radical attached through a carbon atom. For instance, $R_2$ may be an aliphatic radical such as methyl, ethyl, propyl, isopropyl, butyl, butenyl, pentyl, pentenyl, cyclopentyl, cyclopentenyl, cyclohexyl, cyclohexadienyl, etc. or may be of aromatic character, such as for instance phenyl, p-xylyl, benzyl, p-tertiary butyl phenyl, cinnamyl, beta phenyl ethyl, etc. Particular properties may also be imparted to the products by employing compounds in which the $R_2$ group contains one or more substituted groups; for example, by employing dialdehydes containing the various chloro, bromo, amino, hydroxy, alkoxy, thiol, etc., substituted radicals. As the weight of the $R_2$ substituent increases, the rate of reaction is somewhat decreased and the product in general tends to become soluble in non-polar solvents.

The above-described applicable dialdehydes may be reacted, in general, with any amino compound containing at least one replaceable amino-hydrogen atom. As examples of amino-compounds which may be employed may be mentioned, besides ammonia, for example, the primary and secondary alkyl amines, alkanolamines, cycloparaffin amines, benzyl amines, aniline, piperidine, allyl amines, p-toluidine, alkyl diamines, aliphatic amino acids, as well as amino-compounds in which one or two of the amino hydrogen atoms of ammonia have been replaced by substituted radicals, such as

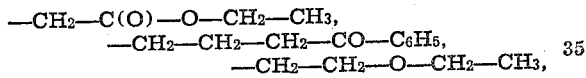

and the like. The character of the amino compound employed, however, affects to a considerable degree the properties of the product and the rate of reaction.

While in general any of the above mentioned amino compounds can be made to react with dialdehydes of the general formula II, those of secondary character react to give products of relatively restricted utility. The compounds of the general formula I, for example, derived from secondary amines may find application as intermediates in chemical synthesis, but are incapable of forming the valuable and useful metal derivatives described below.

Other disadvantages of the use of secondary amines is their lower reaction rate. While ammonia and primary amines tend, in general, to react smoothly with good yields, secondary amines, with the exception of the few lower aliphatic secondary amines, react rather slowly. For these reasons, the products corresponding to the general formula I derived from secondary amines represent a less important embodiment of our invention. Of the amino methylene aldehydes of the structure I, those prepared by reacting amino-compounds of predominantly aliphatic character are, in general, the most suited as intermediates in organic synthesis, and are therefore preferred.

While we may prepare amino methylene aldehydes of the general structure I, according to the above described process, we have found a much better method for the preparation of these compounds. According to the preferred process of our invention, the amino methylene aldehydes are prepared by reacting an amino-compound, such as described above, not with a dialdehyde of the general formula II, but with a compound conceivably derived therefrom by reaction with an alcohol. Thus, for example, we preferably react one of the above described amino compounds with a compound of one of the following general structures:

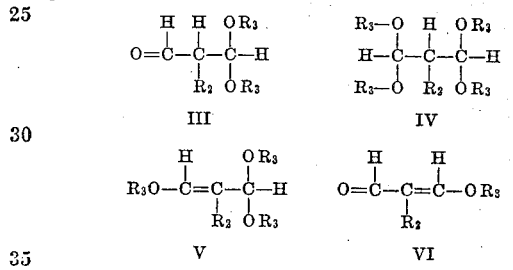

wherein $R_2$ has the same significance as the above and $R_3$ represents an aliphatic radical such as for instance methyl, ethyl, propyl, etc.

Compounds of the above general structures III, IV, V, and VI as will be readily seen, may be considered as the mono-acetals, di-acetals, enol ether acetals and enol ethers, respectively, of the dialdehydes of the general formula II. They are conceivably, although not necessarily, derived from the above described dialdehydes by reaction with an alcohol ($R_3OH$) according to the schemes:

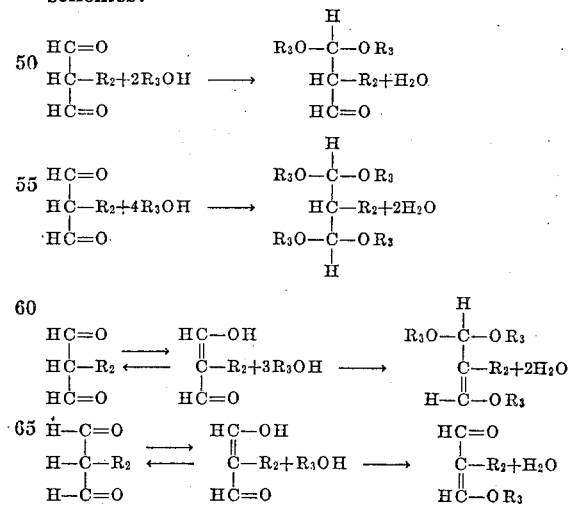

The preparation of the present amino methylene aldehydes by reacting an amino compound with these acetals, enol ethers or enol ether acetals, conceivably derived from the corresponding 1,3 dialdehyde, according to the preferred process of the invention, is a much more simple and practical method, and in general eliminates the necessity of preparing and isolating the 1,3 dialdehydes per se, many of which can only be prepared with relatively poor yields and with considerable difficulty.

The reactions involved when reacting amino compounds with the above described derivatives of 1,3 dialdehydes may be illustrated by the following examples:

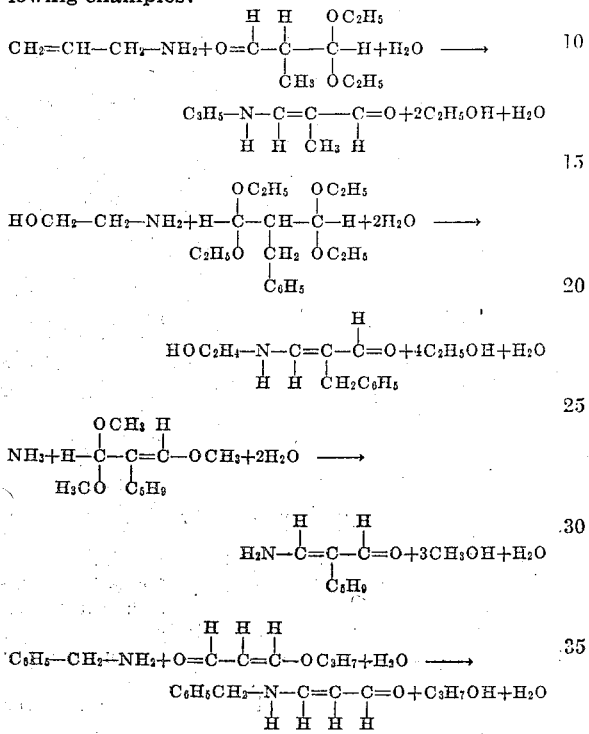

The reaction of the amino-compound with dialdehydes of the general structure II, or according to the preferred embodiment of the process of the invention, with an acetal, enol ether or enol ether acetal of the 1,3 dialdehyde, does not require particular precautions, but takes place, in general, at a convenient rate at normal or moderate temperatures. In many cases such as, for instance, when the most active reagents are employed (for example, lower aliphatic amines with acetals, enol ethers or enol ether acetals of 1,3 dialdehydes containing as $R_2$ groups a hydrogen atom or a lower alkyl group), we have found it advisable, but not essential, in order to obtain the best yields, to add the reactant slowly while maintaining the reaction mixture at room temperature or below by cooling. After the major portion of the reaction has taken place the reaction mixture may be advantageously allowed to stand for several hours at normal temperatures to insure completion of the reaction. In some cases where less reactive reagents are employed a moderate heating, such as for instance 30–50° C., may be advantageously employed to initiate and, if desired, maintain a satisfactory reaction rate.

When preparing amino methylene aldehydes according to the preferred embodiment of the invention, (i. e., by using an acetal, enol ether or enol ether acetal), as can be seen from the above equations, it is necessary that enough water should be present in the reaction mixture to form a molecule of alcohol from each of the —$OR_3$ groups present. Since the products, particularly the lower members and those in which the $R_1$ and/or $R_2$ groups contain substituted hydrophillic groups, are generally water-soluble and their recovery in the anhydrous state from water solutions is in some cases somewhat difficult, it is, in general, advisable in most cases to avoid the presence of any water above that required in the reaction.

The reaction may, if desired, be executed in the presence of an inert solvent or diluent. For this purpose any inert liquid material, preferably a solvent for one or both of the reactants, may be used. As examples of suitable diluents may be mentioned diethyl ether, benzene, chloroform, and the like. The normally liquid paraffin hydrocarbons such as hexane are especially suited.

The following examples which, it is to be understood, are not to be considered as limiting the invention in any manner, are given to illustrate the preparation of a few of the simpler amino methylene aldehydes according to the preferred process of the invention.

*Example I*

50 gms. of ethyl amine was added slowly to 174 gms. of ethoxy-methylene acetaldehyde diethyl acetal and 54 gms. of water while stirring and cooling with ice. The reaction mixture was allowed to stand over night and was then subjected to a fractional distillation under vacuum. A good yield of a product having the formula

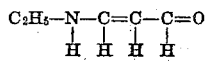

was obtained. This compound is a clear, stable, water-soluble acid-reacting liquid, boiling at 110–112° C. at 9 mm. pressure.

*Example II*

37 gms. of methyl amine were conducted in gaseous form into a mixture of 174 gms. of ethoxy methylene acetaldehyde diethyl acetal and 54 gms. of water while stirring and cooling with ice. The reaction mixture was allowed to stand for 24 hours and then subjected to a fractional distillation under vacuum. A product having the formula

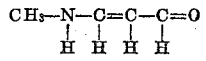

was obtained in a yield of 44 gms. corresponding to 52% of the theory. This compound is an acid-reacting, clear, stable, water-soluble liquid boiling at 73–75° C. at 0.1 mm. pressure.

*Example III*

50 gms. of butyl amine were added to a solution of 50 gms. malonic dialdehyde in 100 gms. aqueous alcohol, whereupon the mixture was heated to about 80° C. during 1 hour and then subjected to a fractional distillation under vacuum. The reaction product

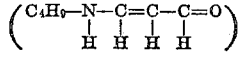

was a clear, stable, water-soluble, acid-reacting liquid boiling at 58–60° C. under 0.04 mm. pressure and was obtained in an amount of 53 gms.

*Example IV*

37.6 gms. of ethoxy methylene-2 propionaldehyde-1 diethyl acetal were mixed with 10.8 gms. of water and 9.0 gms. of ethyl amine and the mixture was shaken during 48 hours. The reaction product was then subjected to a fractional distillation under vacuum, which yielded 17 gms. of ethyl aminomethylene propionaldehyde

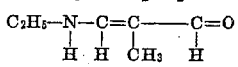

boiling at 111–112° C. under 0.2 mm. pressure.

The other amino aldehydes of the general structure I may also be prepared in a similar manner.

The present amino methylene aldehydes are distinctly acid, and in many cases very strongly acidic in character. This is due to the ability of all the amino aldehydes of the general formula I prepared by using a primary amine or ammonia (i. e. in which $R_1$ in at least one case is hydrogen) to tautomerize, at least partially, into the strongly acidic enol form.

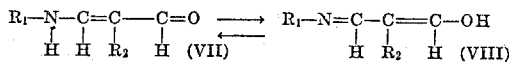

We have found that these amino methylene aldehydes of the structures VII and/or VIII may be readily converted into new and valuable metal derivatives by reacting with suitable salts of metals. In general, these amino methylene aldehydes may be reacted with salts of any of the metals of atomic number greater than 21. Of the available metal salts, those in which the metal atom exists with a valence of from two to four, such as for instance $Ti^{++++}$, $Mn^{++}$, $Fe^{++}$, $Co^{++}$, $Ni^{++}$, $Cu^{++}$, $Zn^{++}$, $Sn^{++++}$, $Sb^{+++}$, $Hg^{++}$, $Pb^{++++}$, etc., are in general preferred. Of the available salts of the metals we may employ for example the halides, sulfates, nitrates, carbonates, chlorates, perchlorates, salts of organic acids and the like. We prefer in general salts having an appreciable solubility in water and/or alcohol. Examples of suitable metal salts are $SbCl_3$, $CdCl_2$, $CoCl_2$, $CoCl_3$, $CuCl_2 \cdot 2NH_4Cl \cdot 2H_2O$, $CuCl_2$, $FeCl_2$, $FeCl_3$, $MnCl_2$, $MnCl_4$, $NiCl_2$, $SnCl_2$, $SnCl_4$, $TiCl_2$, $TiCl_3$, $TiCl_4$, $VCl_4$, $ZnCl_2$, $AsF_3$, $CrBr_3$, $CuBr_2$, $FeBr_2$, $FeBr_3$, $VBr_3$, $Co(ClO_4)_2$, $Cu(ClO_3)_2$, $Pb(ClO_3)_2$, $Ni(ClO_3)_2$, $AgClO_4$, $CdCO_3$, $Cr(NH_4)(SO_4)_2$, $Cr_2(SO_4)_3$, $Mn(NO_3)_2$, $ZnSO_4$, antimony lactate, basic iron acetate, iron malate, basic lead acetate, mercuric acetate, silver salicylate, zinc acetate, zinc benzoate, zinc citrate, and the like.

The metal derivatives prepared by the reaction of the present amino methylene aldehydes with metal salts vary in structure and properties depending upon the number of the anions of the metal salt displaced by the amino methylene aldehyde. For example, when a di-valent metal salt such as $CoCl_2$, $NiCl_2$, $Cu(C_2H_3O_2)_2$, or the like, is reacted with an excess of an amino methylene aldehyde, compounds of the following structures are obtained:

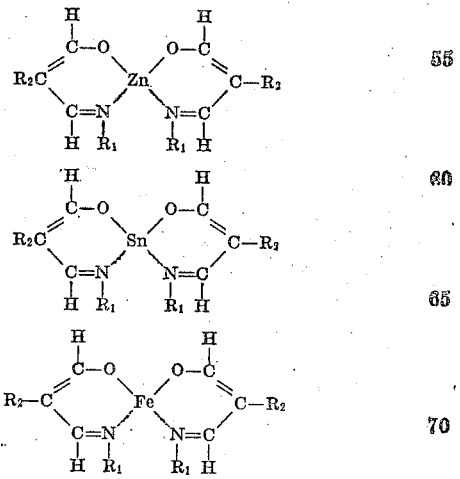

Certain properties of the metal derivatives indicate that the metal atom is bound by secondary valence forces to the nitrogen atoms. These secondary valence bonds, probably present, are indicated in the above formulae by broken lines.

The reaction of the amino methylene aldehyde with the metal salt to form the metal derivative may be simply brought about by mixing a solution of the metal salt with a solution of the amino methylene aldehyde or alkali salt thereof at ordinary temperature. The metal derivative separates out in general as an oily layer which usually crystallizes upon standing, or separates directly as a precipitate, depending upon the metal used and the character of the amino methylene aldehyde employed.

The majority of the metal derivatives may be prepared, for example, by adding a solution of the metal salt to a solution of the amino methylene aldehyde in an equimolar quantity of a dilute alkali. The product which, in the case of most of the higher homologues, separates as a granular precipitate may be washed and dried. In general, to free the product from any occluded metal oxides or hydroxides, it may be dissolved in a suitable organic solvent, filtered and recovered pure from the solvent by precipitation therefrom or by evaporation of the solvent.

Many of the lower homologues, i. e. metal derivatives in which $R_1$, $R_2$ and/or $R_4$ are hydrogen atoms, or lower molecular weight radicals, separate as liquids which, in some cases, are difficult to crystallize. For instance, the following metal derivatives are liquids which may be distilled. Their respective boiling points are given in the parentheses.

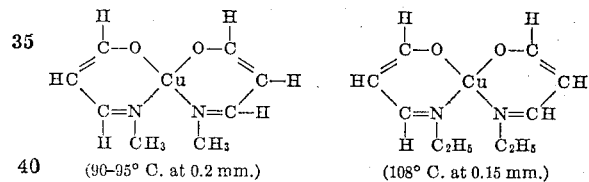

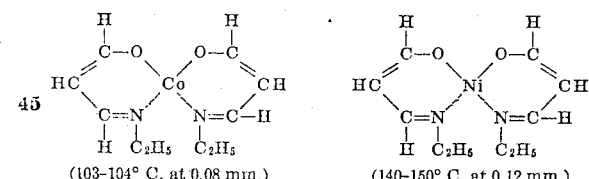

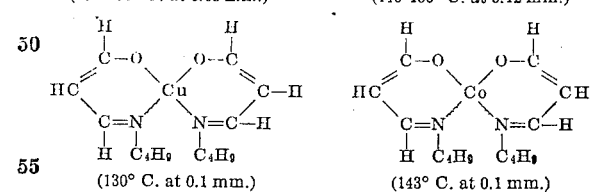

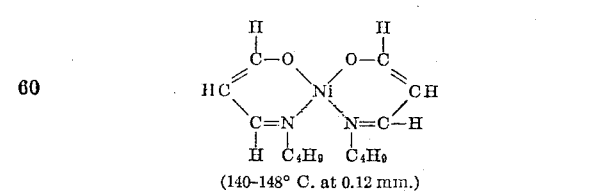

It is usually advantageous in the recovery and purification of such lower homologues as the above to avoid unnecessary quantities of water during the reaction. Thus, for example, a concentrated aqueous solution of copper acetate may be added to a solution of the amino methylene aldehydes in acetone, alcohol or the like. By choosing metal salts having an appreciable solubility in alcohol, the reaction may also be advantageously executed in an anhydrous alcoholic medium. This is illustrated by the following example.

Example V

A quantity of ethyl amino methylene acetaldehyde was dissolved in an absolute alcohol solution of an equimolar quantity of sodium ethylate. The metal derivative was formed upon addition to this solution of an absolute alcohol solution of cupric chloride. The metal derivative was purified by fractional distillation under high vacuum (boiling point 108° C. at 0.15 mm. pressure).

Aside from the metal derivatives of the above described type wherein all the principal valences of the metal atom are satisfied by radicals derived from the amino methylene aldehydes, metal derivatives may be prepared in which only a fraction of the anions of the metal salt has been substituted by the amino methylene aldehyde. Thus, for example, by proper choice of metal salts and proportions, compounds of the type illustrated by the compounds

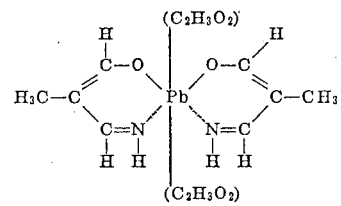

and

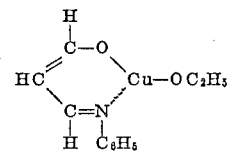

may be prepared. Compounds of this class, wherein one or more of the principal valences of the metal is attached to a salt-forming anion such as for instance an acetate group, nitrate group, chloride, bromide, iodide or the like, are very desirable for certain uses, due to their greater solubility and in general greater reactivity.

The amino methylene aldehydes may also be reacted with metal salts in which only a fraction of the principal valences of the metal atom are satisfied by salt forming anions, while the remaining principal valences are satisfied by organic radicals attached through a carbon atom, i. e., having the general formula $$(A)_x Me(R)_y$$

wherein Me represents an atom of the metal, A represents a salt-forming anion such as described above, R represents an organic radical such as for instance methyl, ethyl, isoamyl, phenyl, benzyl, isobutenyl, p-methoxy phenyl, beta-naphthyl, p-tolyl, p-xylyl, chloroethyl, cyclohexyl, amino phenyl or the like connected to the metal atom through a carbon atom, $x$ represents a positive whole number, and $y$ represents a positive whole number equal to the valences of the metal atom minus $x$. As examples of suitable metal salts of this type may be mentioned trimethyl antimony dilactate, amino phenyl mercuric acetate, diisoamyl tin dibromide, dibenzyl tin diacetate, dibenzyl tin dichloride, diethyl-n-propyl tin chloride, diphenyl tin hydroxy chloride, lead diphenyl dichloride, lead diphenyl dibromide, and the like. By employing salts of this type in which at least one organic radical is attached to the metal atom through a carbon atom, metal derivatives such as

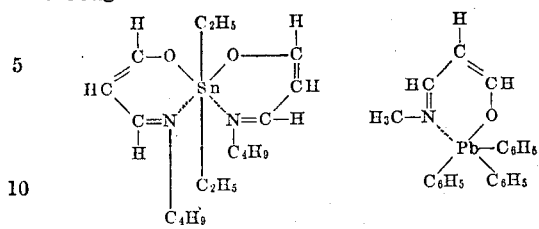

and the like may be formed.

Metal derivatives of this type having organic radicals attached to the metal atom by a metal-carbon linkage differ, in general, considerably in physical and chemical properties from the metal derivatives described above in which the organic radicals are all attached to the metal atom through oxygen. These metal derivatives, for example, have, in general, appreciably higher vapor pressures, lower boiling points, greater solubilities in non-polar solvents, and decreased solubilities in aqueous media. They are, for example, excellent as a means for introducing various metals in a reactive form in solution in various organic and non-polar solvents.

The amino methylene aldehydes of the present invention are valuable as intermediates for the preparation of numerous compounds. Aside from their use as intermediates in the preparation of the metal-organic compounds described above, they may find application as intermediates in the preparation of many organic compounds which are difficult or as yet impossible to prepare by other methods.

The metal derivatives of the present amino methylene aldehydes may find application, for example, in the preparation of insecticidal, fungicidal, and/or bactericidal compositions, in preparations for the proofing of textiles, furs and cellulosic materials against moths, beetles, termites and other pests, in the preparation of pharmaceuticals, in fuels for internal combustion engines, in the treatment of plant seeds, and the like.

We have in the foregoing described our invention in some detail and have illustrated the preparation of several typical representative examples of the broader class of amino methylene aldehydes and metal derivatives to which our invention relates. It is to be understood, however, that while we have described, illustrated and explained the various aspects of the invention according to the best of our present knowledge, our invention is not to be limited to the specific illustrative examples, nor by the soundness or accuracy of any theories, structural formulae or the like.

We claim as our invention:

1. Process for the preparation of an amino methylene aldehyde of the structure

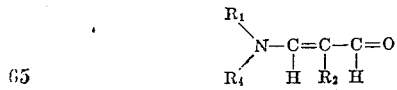

wherein $R_1$, $R_2$ and $R_4$ each represent a substituent of the group consisting of the hydrogen atom and monovalent hydrocarbon radicals connected through a carbon atom which comprises, reacting substantially equimolecular quantities of an amine of the formula.

with a compound selected from the group consisting of 1,3 dialdehydes of the structure

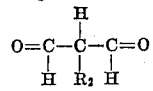

an acetal thereof and an enol ether thereof.

2. Process for the preparation of an amino methylene aldehyde of the structure

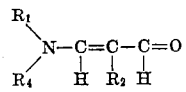

wherein $R_1$, $R_2$ and $R_4$ each represent a substituent of the group consisting of the hydrogen atom and monovalent hydrocarbon radicals connected through a carbon atom which comprises reacting substantially equimolecular quantities of an amine of the formula

with an acetal of a 1,3 dialdehyde of the structure

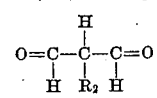

3. Process for the preparation of an amino methylene aldehyde of the structure

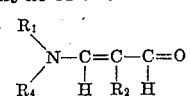

wherein $R_1$, $R_2$ and $R_4$ each represent a substituent of the group consisting of the hydrogen atom and monovalent hydrocarbon radicals connected through a carbon atom which comprises reacting substantially equimolecular quantities of an amine of the formula

with an enol ether of a 1,3 dialdehyde of the structure

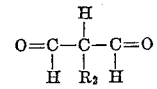

4. Process for the production of an amino methylene aldehyde of the structure

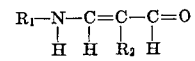

wherein $R_1$ and $R_2$ each represent a substituent of the group consisting of the hydrogen atom and monovalent hydrocarbon radicals connected through a carbon atom which comprises, reacting substantially equimolecular quantities of a primary amine of the formula $R_1NH_2$ with a compound selected from the group consisting of 1,3 dialdehydes of the structure

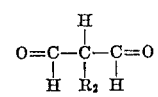

acetals thereof and enol ethers thereof.

5. Process for the production of an amino methylene aldehyde of the structure

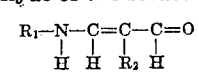

wherein $R_1$ and $R_2$ each represent a substituent of the group consisting of the hydrogen atom and monovalent hydrocarbon radicals connected through a carbon atom which comprises, reacting substantially equimolecular quantities of a primary amine of the formula $R_1NH_2$ with an enol ether of a 1,3 dialdehyde of the structure

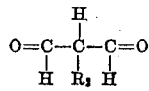

6. Process for the production of an amino methylene aldehyde of the structure

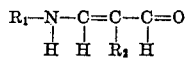

wherein $R_1$ and $R_2$ each represent a monovalent, hydrocarbon radical connected through a carbon atom which comprises, reacting substantially equimolecular quantities of a primary amine of the formula $R_1NH_2$ with an acetal of a 1,3 dialdehyde of the structure

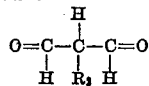

7. An amino methylene aldehyde of the structure

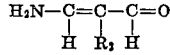

wherein $R_2$ represents an alkyl radical.

8. An amino methylene aldehyde of the structure

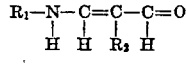

wherein $R_1$ represents an aryl radical and $R_2$ represents an alkyl radical.

9. An amino methylene aldehyde of the structure

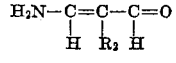

wherein $R_2$ represents a substituent of the group consisting of the hydrogen atom and monovalent hydrocarbon radicals.

10. An amino methylene aldehyde of the structure

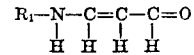

wherein $R_1$ represents a lower alkyl radical.

11. An amino methylene aldehyde of the structure

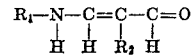

wherein $R_1$ represents a substituent of the group consisting of the hydrogen atom and monovalent hydrocarbon radicals and $R_2$ represents an alkyl radical.

12. An amino methylene aldehyde of the structure

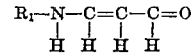

wherein $R_1$ represents an aliphatic hydrocarbon radical.

13. An amino methylene aldehyde of the structure

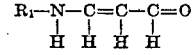

wherein $R_1$ represents a substituent of the group consisting of the hydrogen atom and monovalent hydrocarbon radicals.

14. An amino methylene aldehyde of the structure

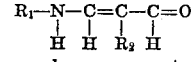

wherein $R_1$, $R_2$ each represent a substituent of the group consisting of the hydrogen atom and monovalent hydrocarbon radicals.

ADRIANUS JOHANNES VAN PESKI.
NICOLAAS MAX.
JOHANNES ANDREAS VAN MELSEN.